US008913543B2

(12) United States Patent
Zainaldin (10) Patent No.: US 8,913,543 B2
(45) Date of Patent: Dec. 16, 2014

(54) COOPERATIVE RELAYING AND NETWORK CODING IN A CELLULAR COMMUNICATIONS SYSTEM

(75) Inventor: Ahmed Zainaldin, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 50 days.

(21) Appl. No.: 13/409,842

(22) Filed: Mar. 1, 2012

(65) Prior Publication Data

US 2013/0229975 A1 Sep. 5, 2013

(51) Int. Cl.
*H04B 7/02* (2006.01)
*H04W 72/04* (2009.01)
*H04W 74/08* (2009.01)

(52) U.S. Cl.
CPC ............ *H04B 7/02* (2013.01); *H04W 74/0808* (2013.01)
USPC ........................................................ 370/315

(58) Field of Classification Search
CPC ..... H04L 1/0009; H04L 1/004; H04L 1/0618; H04L 1/0606; H04L 1/0047; H04L 1/0076; H04L 1/189; H04L 12/569; H04L 12/4015; H04L 63/1475; H04B 7/022; H04B 7/02; H04W 74/0808; H04W 72/04
USPC ........................................................ 370/315
See application file for complete search history.

(56) References Cited

U.S. PATENT DOCUMENTS

| | | | |
|---|---|---|---|
| 7,844,308 B2 * | 11/2010 | Rhee et al. ..................... 455/574 |
| 8,107,498 B2 * | 1/2012 | Morimoto et al. ............ 370/501 |
| 8,233,939 B2 * | 7/2012 | Li et al. ......................... 455/561 |
| 2002/0044549 A1 * | 4/2002 | Johansson et al. ............ 370/386 |
| 2007/0291678 A1 * | 12/2007 | Chowdhury et al. ......... 370/328 |
| 2008/0031177 A1 * | 2/2008 | Lee et al. ....................... 370/312 |
| 2008/0101414 A1 * | 5/2008 | Zhang ............................ 370/476 |
| 2008/0137585 A1 * | 6/2008 | Loyola et al. ................. 370/315 |
| 2010/0173659 A1 | 7/2010 | Shin et al. |
| 2010/0220644 A1 | 9/2010 | Reznik et al. |
| 2010/0316097 A1 | 12/2010 | Wang et al. |
| 2011/0016316 A1 * | 1/2011 | Amir et al. .................... 713/168 |
| 2011/0026429 A1 | 2/2011 | Slimane et al. |
| 2011/0211695 A1 * | 9/2011 | Westerveld ................... 380/212 |
| 2011/0305213 A1 * | 12/2011 | Lohr et al. ..................... 370/329 |

OTHER PUBLICATIONS

Sachin Katti, "XORs in the Air: Practical Wireless Network Coding", 2006.*
Katti, S. et al., "XORs in the Air: Practical Wireless Network Coding," SIGCOMM, Sep. 11-15, 2006, Pisa Italy, 12 pages.
Ahlswede, R. et al., "Network Information Flow," IEEE Transactions on Information Theory, vol. 46, No. 4, Jul. 2000, pp. 1204-1216.
Unknown, "Cooperative Diversity," Wikipedia, published at least as early as Jun. 3, 2011, 7 pages.

(Continued)

*Primary Examiner* — Mark Rinehard
*Assistant Examiner* — Ellen A Kirillova
(74) *Attorney, Agent, or Firm* — Withrow & Terranova, PLLC (57) ABSTRACT

Cooperative relaying and network coding to implement diversity in a cellular communications system is disclosed. A primary network node diversity combines a first copy of a first packet overheard by the primary network node with a second copy of the first packet received in a network coded packet from a relay network node to form a combined first packet.

15 Claims, 7 Drawing Sheets

(56) References Cited

OTHER PUBLICATIONS

Ho-Van, Khuong et al., "Performance of 2-1-1 Coded Cooperative Relaying Scheme," 2011 IEEE 24th Canadian Conference on Electrical and Computer Engineering (CCECE), May 8, 2011, pp. 727-730.

Li, Zongyan et al., "Network Coding System Based on LDPC Product Codes in Multiple-Access Relay System," 2011 IEEE International Conference on Communications Workshops (ICC), Jun. 5, 2011, pp. 1-4.

Woldegebreal, Dereje H. et al., "Multiple-Access Relay Channel with Network Coding and Non-Ideal Source-Relay Channels," IEEE 4th International Symposium on Wireless Communication Systems, Oct. 1, 2007, pp. 732-736.

International Search Report and Written Opinion for PCT/IB2013/051625, mailed Jun. 13, 2013, 20 pages.

International Preliminary Report on Patentability and Written Opinion for PCT/IB2013/051625, mailed Sep. 12, 2014, 14 pages.

\* cited by examiner

COOPERATIVE RELAYING AND NETWORK CODING IN A CELLULAR COMMUNICATIONS SYSTEM

FIELD OF THE DISCLOSURE

The subject disclosure relates generally to cellular communications systems, and in particular to the use of cooperative relaying and network coding to implement diversity in a cellular communications system.

BACKGROUND

Newer generation cellular communications systems, such as a 3rd Generation Partnership Project (3GPP) Long Term Evolution (LTE) cellular communications system, promise the delivery of services, such as wirelessly streaming high-definition video to a mobile user travelling in a vehicle, that were not possible only a few years ago. Due to the nature of wireless communications with mobile devices, the quality of a channel between a network node and a mobile device may change from moment to moment. As the quality of the channel declines, an increasingly large number of data packets are not successfully communicated from one end of the channel to the other end of the channel, and must be retransmitted. At peak usage times, a cellular communications system may be heavily loaded; consequently, there may be substantial competition for the finite resources, such as time slots and frequencies, which are required to communicate data between devices in the cellular communications system. Retransmissions of packets only exacerbate this situation. Accordingly, there is a need for mechanisms and techniques that help increase the likelihood of successful transmissions in a cellular communications system to reduce the need for retransmissions.

SUMMARY

The present disclosure relates to the use of cooperative relaying in conjunction with network coding to implement diversity in a cellular communications system in an efficient manner. In one embodiment, a cellular coverage area includes a primary network node and one or more relay network nodes. A relay network node relays data, such as packets, received from user equipment (UE) devices to the primary network node. The primary network node is aware of future transmissions of packets from UE devices to the relay network node. The primary network node may be aware of such future transmissions because such future transmissions are, for example, identified in a transmission schedule.

The primary network node determines a first time of a scheduled first transmission of a first packet that is to be wirelessly transmitted from a first UE device to the relay network node. The primary network node also determines a second time of a scheduled second transmission of a second packet that is to be wirelessly transmitted from a second UE device to the relay network node. At the first time, the primary network node overhears the scheduled first transmission directly from the first UE device, and generates a first copy of the first packet. At the second time, the primary network node overhears the scheduled second transmission directly from the second UE device, and generates a first copy of the second packet.

The primary network node subsequently receives, from the relay network node, a network coded packet in which a second copy of the first packet has been encoded. The primary network node decodes the network coded packet to extract the second copy of the first packet, and then diversity combines the first copy of the first packet and the second copy of the first packet to form a combined first packet. A second copy of the second packet may also be encoded in the network coded packet. The primary network node may also decode the network coded packet to extract the second copy of the second packet and diversity combine the first copy of the second packet and the second copy of the second packet to form a combined second packet. In this manner, network coding is used to implement diversity for multiple packets originating from multiple devices in a single time slot.

In one embodiment, the primary network node overhears the first transmission by listening for the scheduled first transmission at the first time and at a first scheduled frequency. Similarly, the primary network node overhears the second transmission by listening for the scheduled second transmission at the second time and at a second scheduled frequency. Thus, the primary network node may selectively listen for only those transmissions that may be suitable for network coding by a relay network node.

The primary network node may direct the relay network node to network code the second copy of the first packet and the second copy of the second packet in the network coded packet. The primary network node may use the first copy of the first packet to decode the network coded packet and thereby extract from the network coded packet the second copy of the second packet. The primary network node may use the first copy of the second packet to decode the network coded packet and thereby extract from the network coded packet the second copy of the first packet.

In another embodiment, the primary network node may be aware of a third time of a scheduled third transmission of a third packet that is to be wirelessly transmitted from a third UE device to the relay network node, but the primary network node may be outside of a transmission range of the third UE device, and therefore unable to overhear the scheduled third transmission. The primary network node directs the relay network node to network code the second copy of the first packet, the second copy of the second packet, and a first copy of the third packet into the network coded packet. The primary network node then receives the network coded packet, and uses the first copy of the first packet and the second copy of the second packet to decode the network coded packet and thereby extract the first copy of the third packet from the network coded packet. In this embodiment, network coding the three packets into the network coded packet provides diversity for the first and second packets, as well as the relaying of the third packet to the primary network node, all in a same time slot, thus reducing by two-thirds the number of time slots that would otherwise be necessary to accomplish these tasks.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to the use of cooperative relaying in conjunction with network coding to implement diversity in a cellular communications system in an efficient manner. Diversity combining is a technique that combines multiple received signals to form a single improved signal. Diversity combining typically reduces retransmissions in a telecommunications system because the single improved signal may contain an accurate copy of the signal transmitted by the source, even where no single copy of the transmitted signal was received error-free. Techniques for diversity combining are known to those skilled in the art and will not be discussed in detail herein.

In the present disclosure, the signals are in the form of packets of information, referred to herein as packets. Multiple copies of a packet may be received from different paths and diversity combined to form a combined packet that accurately reflects the originally transmitted packet, even though the individual packets may each contain an error.

Network coding reduces the network resources it would otherwise take to communicate additional copies of packets used for diversity. Before delving further into the details of the present embodiments, network coding will initially be discussed to provide context for the subsequent discussion of the present embodiments.

Figure 1A:
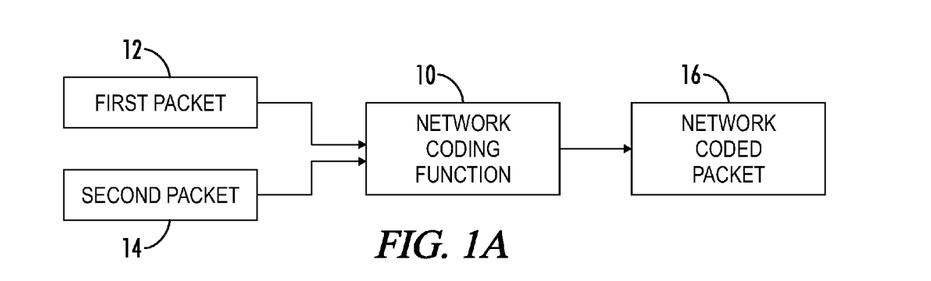
FIG. 1A is a block diagram illustrating an exemplary process for network coding two packets to form a network coded packet.

FIG. 1A is a block diagram illustrating an exemplary process for network coding two packets to form a network coded packet. A network coding function 10 receives, or otherwise inputs, a first packet 12 and a second packet 14. The network coding function 10 then performs an operation on the data in the first packet 12 and the second packet 14 to form a network coded packet 16.

The term "packet" is used herein to refer to any unit of data which the network coding function 10 is capable of inputting in order to network code the unit of data. Thus, a packet may comprise, for example, one or more messages, or one or more sub-units of data, such as one or more Internet Protocol (IP) packets, user datagram packets, or the like. The use of ordinals such as "first" or "second" herein is solely to distinguish elements that otherwise may have similar or identical names, such as the "first packet 12" and the "second packet 14," and does not imply an importance, priority, or other attribute unless otherwise explicitly stated herein.

The network coding function 10 is typically a logical operation or function, such as an exclusive OR (XOR) function, that operates on the bits of data in the first packet 12 and the second packet 14 to form the network coded packet 16. The network coded packet 16 comprises a fewer number of bits than the total number of bits in both the first packet 12 and the second packet 14, and yet, when properly decoded, both the first packet 12 and the second packet 14 can be extracted from the network coded packet 16. The symbol "⊕" may be used in the Figures to depict network coded packets. While for purposes of illustration the network coding function 10 is illustrated as network coding two packets, the network coding function 10 is not limited to network coding only two packets, and a greater number of packets may be network coded to thereby form a network coded packet from which each of such greater number of packets may be extracted when properly decoded.

Figure 1B:
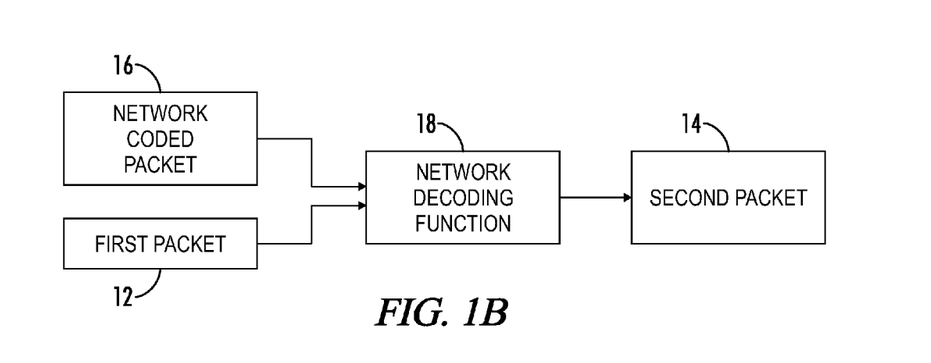
FIG. 1B is a block diagram illustrating an exemplary process for network decoding the network coded packet illustrated in FIG. 1A, wherein one packet encoded in the network coded packet is used to extract another packet encoded in the network coded packet.

FIG. 1B is a block diagram illustrating an exemplary process for network decoding the network coded packet 16 illustrated in FIG. 1A. In particular, a network decoding function 18 inputs one of the packets that are encoded in the network coded packet 16 to extract the other of the packets that are encoded in the network coded packet 16. In particular, in this example, the network decoding function 18 receives or otherwise inputs the first packet 12 and the network coded packet 16 and extracts from the network coded packet 16 the second packet 14. Although not illustrated, the network decoding function 18 could also input the second packet 14 and the network coded packet 16 to extract the first packet 12 from the network coded packet 16.

Figure 2:
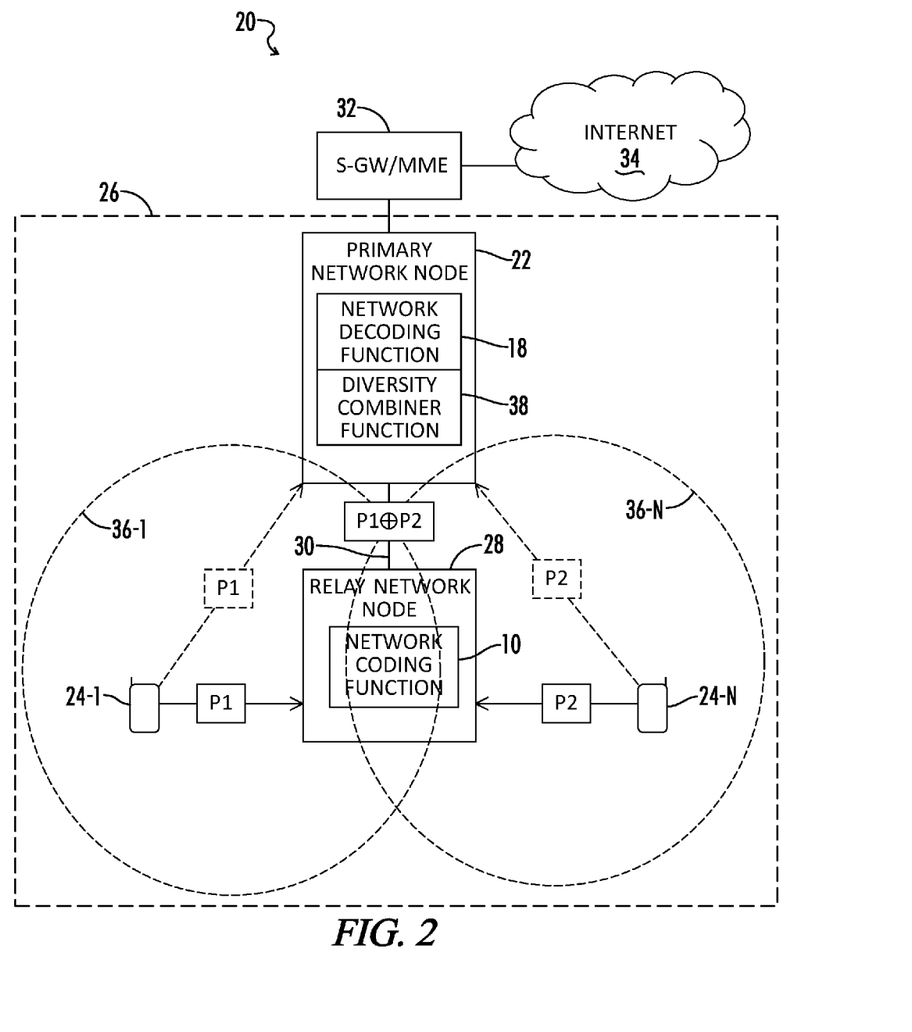
FIG. 2 is a block diagram illustrating a cellular communications system in which embodiments of the present disclosure may be practiced.

FIG. 2 is a block diagram illustrating a cellular communications system 20 in which embodiments of the present disclosure may be practiced. For purposes of illustration, the embodiments will be discussed in the context of a 3rd Generation Partnership Project (3GPP) Long Term Evolution (LTE) cellular communications system 20, but the embodiments are not limited to any particular type of cellular communications system 20. The cellular communications system 20 includes one or more primary network nodes 22 that comprise, for example, a cellular base station such as a 3GPP eNodeB base station, or the like.

The primary network node 22 provides wireless service to one or more user equipment (UE) devices 24-1, 24-N (generally, UE devices 24) within a wireless coverage area 26 of the primary network node 22. While only a single primary network node 22 is illustrated, it will be apparent that the cellular communications system 20 may have many primary network nodes 22 arranged to provide wireless services over a large geographic area. While for purposes of illustration the wireless coverage area 26 is shown as being rectangular, it will be appreciated that the wireless coverage area of a cellular base station is not typically rectangular, and is defined by natural and man-made obstructions, atmospheric and weather conditions, and the like, and can comprise any shape. A UE device 24 may comprise, for example, a cellular telephone such as an Apple® iPhone® smartphone, an Android®-based smartphone, or the like; a computing tablet with cellular capabilities such as an Apple iPad® or the like; a laptop computer with cellular capabilities; or any other processing device capable of communicating wirelessly with a cellular network node.

The primary network node 22 may provide wireless services to the UE devices 24 directly, or via one or more relay network nodes 28. The relay network node 28 may comprise, for example, a femtocell base station such as a 3GPP Home eNodeB (HeNB) base station, a wireless relay node, a picocell base station, or the like. The relay network node 28 relays traffic, such as packets, between the primary network node 22 and a particular UE device 24 via a communications link 30, for those UE devices 24 that are communicatively coupled to the relay network node 28. A UE device 24 may be communicatively coupled to the relay network node 28 based on the physical location of the UE device 24, because the UE device 24 has a particular subscriber relationship to the relay network node 28, or for other reasons. The communications link 30 may be a wireless communications link or a wired communications link. While not illustrated, it will be appreciated that the communications link 30 may include one or more devices in the path of the packets between the relay network node 28 and the primary network node 22, such as routers or the like. The primary network node 22 may be communicatively coupled to a serving gateway mobility management entity (S-GW/MME) 32, which provides the primary network node 22 with access to other resources, such as the Internet 34.

The primary network node 22 serves as a centralized controller for the wireless coverage area 26, and directly or indirectly schedules the network resources available for the wireless communication of data in the wireless coverage area 26. Generally, the network resources include time slots during which a device, such as a UE device 24, the relay network node 28, or the primary network node 22 may wirelessly transmit data, and a frequency at which the data in a time slot is transmitted. For example, assume that the UE devices 24-1, 24-N are communicatively coupled to the relay network node 28, and thus the relay network node 28 relays packets between the UE devices 24 and the primary network node 22. If the UE device 24-N has a packet to transmit to the relay network node 28, the primary network node 22 may schedule the transmission of the packet from the UE device 24-N to the relay network node 28 at a future time T1 and at a frequency F1, and schedule the subsequent transmission of the packet from the relay network node 28 to the primary network node 22 at a future time T2 and at a frequency F2. The schedule is provided to the UE device 24-N and the relay network node 28 prior to time T1. At time T1, the UE device 24-N transmits the packet to the relay network node 28 using frequency F1 in accordance with the schedule, and the relay network node 28 listens for the transmission at time T1 at frequency F1. At time T2, the relay network node 28 transmits the packet using frequency F2 to the primary network node 22. Network resources, such as time slots and frequencies, are finite, and can become scarce as demand for transmissions increases in the wireless coverage area 26.

The UE device 24-1 has a transmission range 36-1 within which a receiver, such as the relay network node 28 and the primary network node 22, may be able to receive transmissions from the UE device 24-1. While for purposes of illustration the transmission range 36-1 is shown as being circular, it will be appreciated that the transmission range 36-1 may be any shape, and typically varies from moment to moment based on any number of factors, such as the precise location of the UE device 24-1 at any particular moment, obstacles between the UE device 24-1 and the recipient of the transmission, weather conditions, interference from other electronic devices, and the like. The UE device 24-N similarly has a transmission range 36-N. Generally, a receiver that is closer to a UE device 24 will receive a stronger signal than a receiver that is farther from the UE device 24, and thus will likely receive a packet transmitted from the UE device 24 with fewer bit errors.

Figure 3:
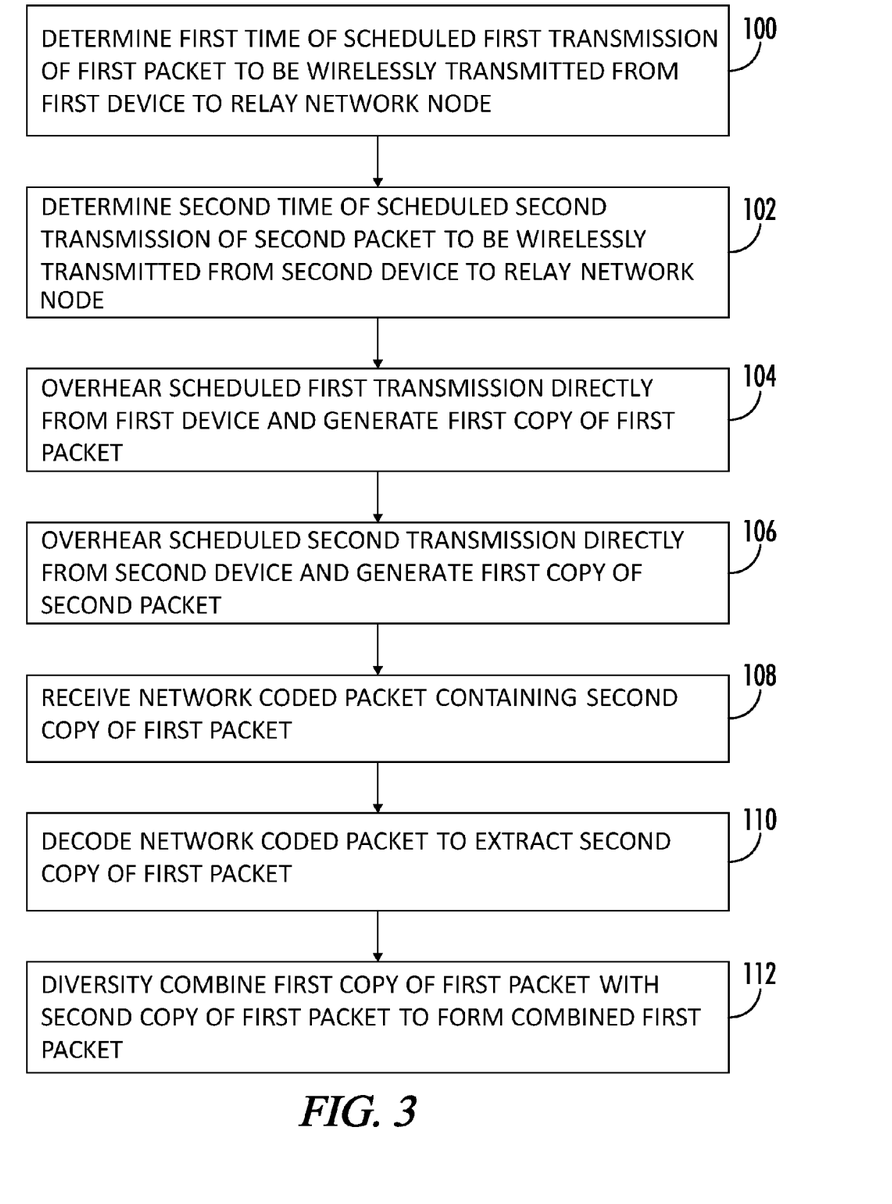
FIG. 3 is a flowchart illustrating an exemplary method of cooperative relaying using network coding in a cellular communications system from a perspective of a primary network node, according to one embodiment.

According to embodiments of the present disclosure, a combination of cooperative relaying and network coding is implemented in the cellular communications system 20 to reduce the number of re-transmissions of packets from a UE device 24, and to reduce the number of network resources that would be required to otherwise implement diversity in accordance with other diversity mechanisms. FIG. 3 is a flowchart illustrating an exemplary method of cooperative relaying using network coding in the cellular communications system 20 from the perspective of the primary network node 22 according to one embodiment, and will be discussed in conjunction with FIG. 2.

Assume that the UE device 24-1 has a first packet P1 for transmission to the relay network node 28, and the first packet P1 will subsequently be transmitted by the relay network node 28 to the primary network node 22. The UE device 24-N has a second packet P2 for transmission to the relay network node 28, and the second packet P2 will subsequently be transmitted by the relay network node 28 to the primary network node 22. The primary network node 22, or another device within the cellular communications system 20, schedules a first transmission of the first packet P1 from the UE device 24-1 to the relay network node 28 at a first time and a first frequency, and a second transmission of the second packet P2 from the UE device 24-N to the relay network node 28 at a second time and a second frequency. The schedule is provided to the UE devices 24; the relay network node 28; and, if not generated by the primary network node 22, to the primary network node 22.

The primary network node 22 accesses the schedule to determine the first time and the first frequency of the first transmission of the first packet P1 to be wirelessly transmitted from the UE device 24-1 to the relay network node 28 (FIG. 2, block 100). For purposes of illustration, the UE device 24-1 may be referred to as the "first device." The primary network node 22 also accesses the schedule to determine the second time and the second frequency of the second transmission of the second packet P2 to be wirelessly transmitted from the UE device 24-N to the relay network node 28 (FIG. 2, block 102). For purposes of illustration, the UE device 24-N may be referred to as the "second device."

At the first time, in the first transmission, the UE device 24-1 transmits the first packet P1 at the first frequency to the relay network node 28. Due to the broadcast nature of wireless transmissions, assume that the primary network node 22 is able to overhear the first transmission of the first packet P1 by listening for the first transmission at the first time and at the first frequency in accordance with the schedule. The primary network node 22 then generates a first copy of the packet P1 (FIG. 3, block 104). The term "overhear" refers to the reception of a transmission by a receiver, such as the primary network node 22, that listens for a transmission that is not addressed to the receiver. Substantially concurrently therewith, the relay network node 28 receives the first packet P1 in accordance with the schedule and generates a second copy of the first packet P1.

At the second time, in the second transmission, the UE device 24-N transmits the second packet P2 at the second frequency to the relay network node 28. The primary network node 22 overhears the second transmission of the second packet P2 by listening for the second transmission at the second time and at the second frequency in accordance with the schedule, and generates a first copy of the second packet P2 (FIG. 3, block 106). Substantially concurrently therewith, the relay network node 28 receives the second packet P2 in accordance with the schedule and generates a first copy of the second packet P2.

The relay network node 28 includes the network coding function 10, and network codes the second copy of the first packet and the second copy of the second packet to generate a network coded packet P1⊕P2. The relay network node 28 communicates the network coded packet P1⊕P2 to the primary network node 22. The primary network node 22 receives the network coded packet P1⊕P2 (FIG. 3, block 108). The primary network node 22 includes the network decoding function 18, and using the first copy of the second packet P2, decodes the network coded packet P1⊕P2 to extract from the network coded packet P1⊕P2 the second copy of the first packet P1 (FIG. 3, block 110). The primary network node 22 also includes a diversity combiner function 38 that diversity combines the first copy of the first packet P1 with the extracted second copy of the first packet P1 to form a first combined packet P1 (FIG. 3, block 112). Similarly, the primary network node 22 may use the first copy of the first packet P1 to decode the network coded packet P1⊕P2 and extract from the network coded packet P1⊕P2 the second copy of the second packet P2. The diversity combiner function 38 may combine the first copy of the second packet P2 with the extracted second copy of the second packet P2 to form a second combined packet P2.

The first combined packet P1, because diversity combined from two separate copies of the first packet P1 that were received via different paths, represents a stronger signal than either of the copies of the first packet P1 by itself. Similarly, the second combined packet P2, because diversity combined from two separate copies of the second packet P2 that were received via different paths, represents a stronger signal than either of the copies of the second packet P2 by itself. Moreover, by network coding the packets P1 and P2 to form the network coded packet P1⊕P2, the relay network node 28 is able to transmit copies of both packets P1 and P2 in a single time slot, reducing by half the number of time slots otherwise required to transmit such packets to the primary network node 22.

Figure 4:
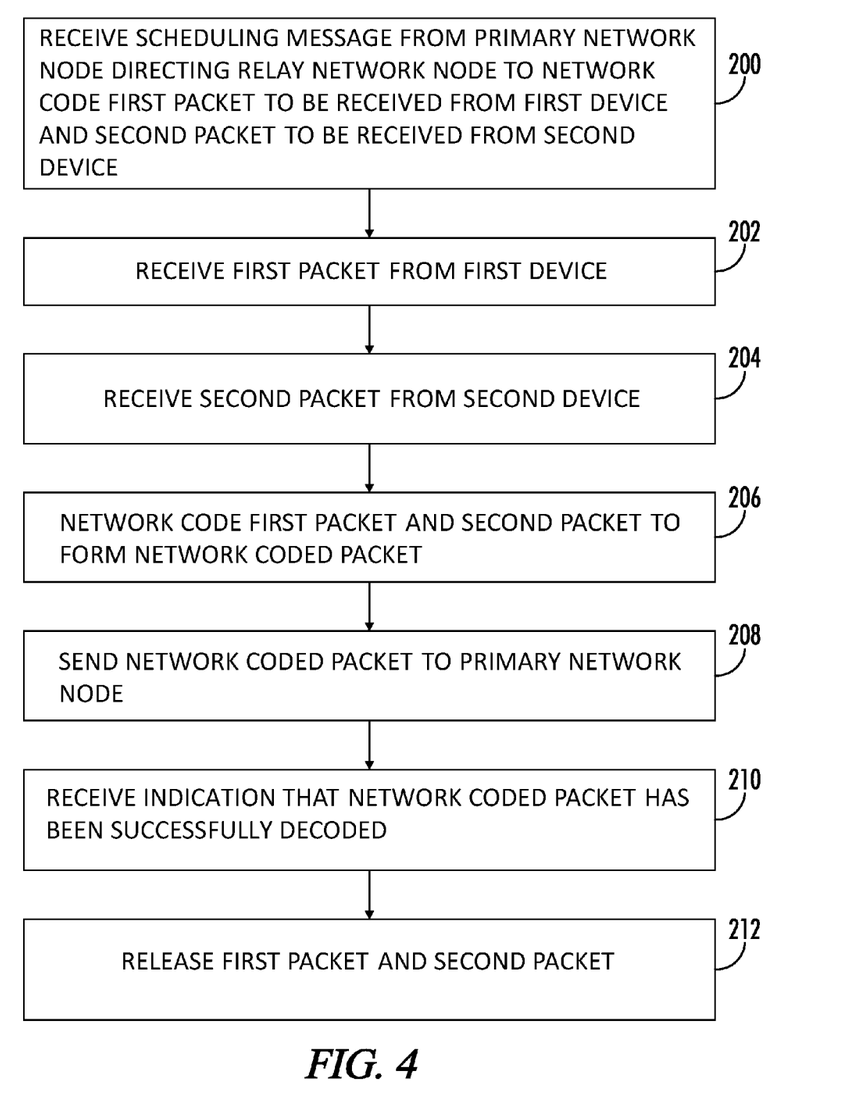
FIG. 4 is a flowchart illustrating an exemplary method of cooperative relaying using network coding in a cellular communications system from a perspective of a relay network node, according to one embodiment.

FIG. 4 is a flowchart illustrating the exemplary method of cooperative relaying using network coding in the cellular communications system 20 illustrated in FIG. 3, from the perspective of the relay network node 28. FIG. 4 will be discussed in conjunction with FIG. 2. Assume that the relay network node 28 network codes packets received from UE devices 24 on a selective basis as directed by the primary network node 22. Accordingly, the relay network node 28 receives a scheduling message from the primary network node 22 that directs the relay network node 28 to network code the first packet P1 to be received from the UE device 24-1 at the first time and at the first frequency with the second packet P2 to be received from the UE device 24-N at the second time and at the second frequency (FIG. 4, block 200). The relay network node 28 receives the first packet P1 from the UE device 24-1 at the first time (FIG. 4, block 202). The relay network node 28 receives the second packet P2 from the UE device 24-N at the second time (FIG. 4, block 204). The relay network node 28 network codes the first packet P1 and the second packet P2 to form the network coded packet P1⊕P2 (FIG. 4, block 206). The relay network node 28 then sends the network coded packet P1⊕P2 to the primary network node 22 (FIG. 4, block 208). The relay network node 28 may then receive an indication, such as an acknowledgment (ACK), that the network coded packet P1⊕P2 was successfully decoded by the primary network node 22 (FIG. 4, block 210). In response to the indication, the relay network node 28 may release the first packet P1 and the second packet P2 (FIG. 4, block 212).

Figure 5:
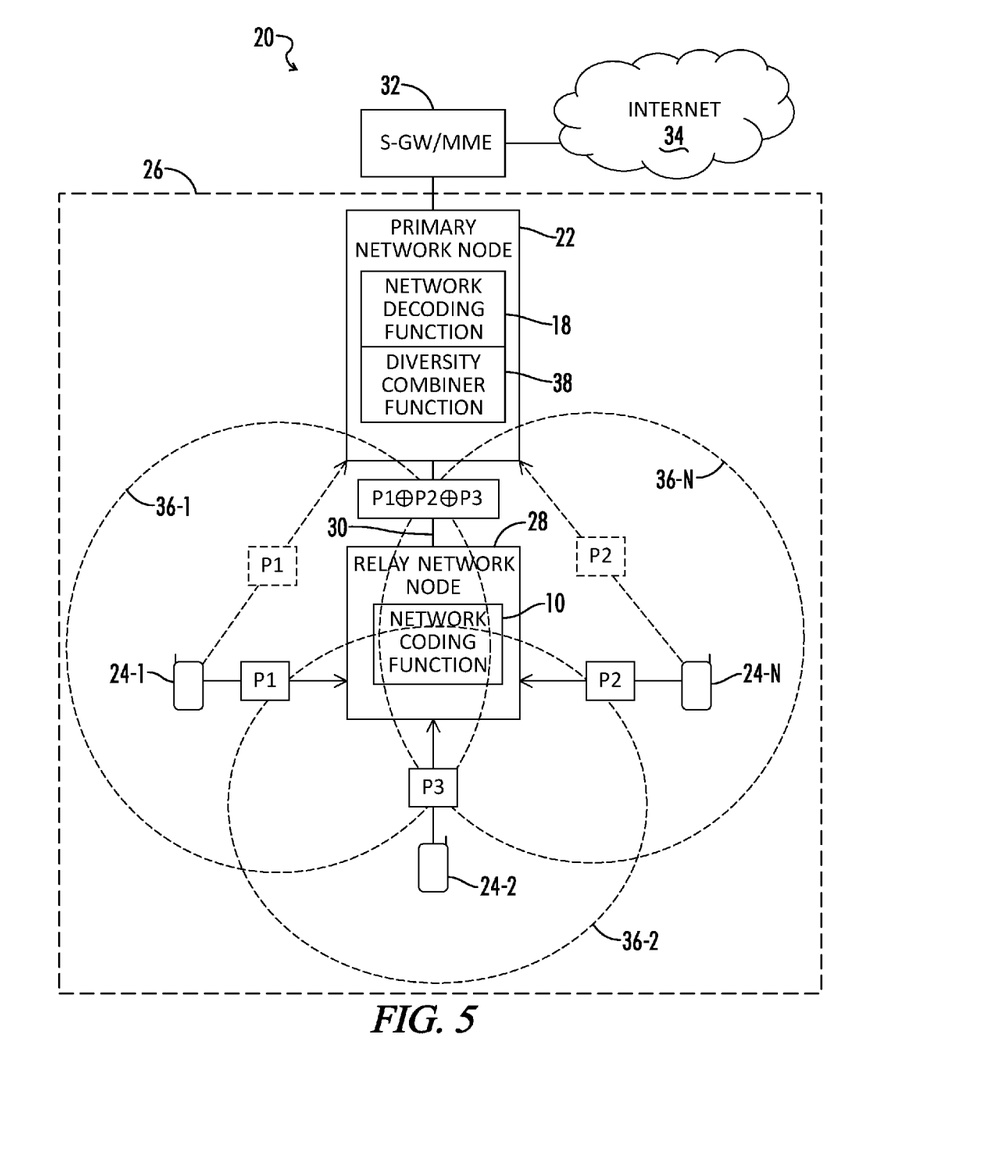
FIG. 5 is a block diagram illustrating a cellular communications system in which additional embodiments of the present disclosure may be practiced.
Figure 6:
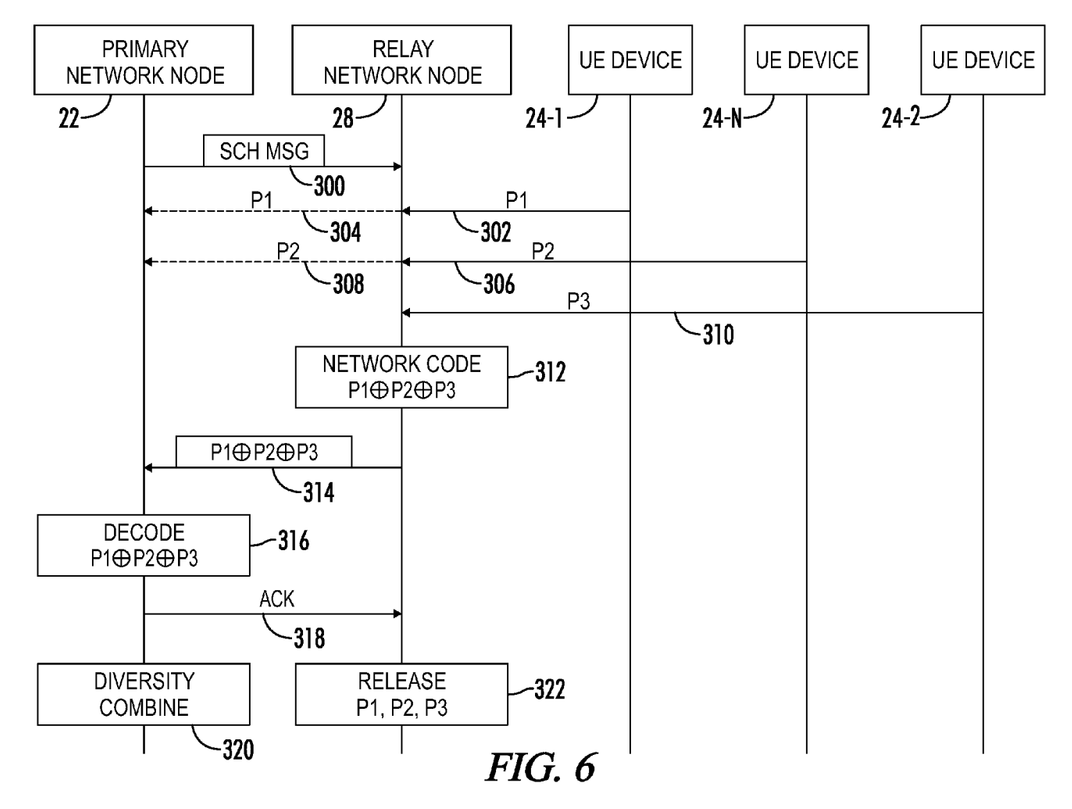
FIG. 6 is a message flow diagram illustrating an exemplary exchange of messages in the cellular communications system illustrated in FIG. 5, according to one embodiment.

FIG. 5 is a block diagram illustrating the cellular communications system 20 in which additional embodiments of the present disclosure may be practiced. FIG. 6 is a message flow diagram illustrating an exemplary exchange of messages in the cellular communications system 20 illustrated in FIG. 5 according to one embodiment. In this embodiment, assume that a UE device 24-2 with a transmission range 36-2 has a packet P3 for transmission to the primary network node 22. The primary network node 22, or another device in the cellular communications system 20, schedules a third transmission at a third time and at a third frequency, so that the UE device 24-2 can transmit the packet P3 to the relay network node 28. The primary network node 22 is outside of the transmission range 36-2 and thus cannot overhear the third transmission, but is aware of the scheduled third transmission.

The primary network node 22 sends a scheduling message to the relay network node 28 that directs the relay network node 28 to network code the second copy of the first packet P1 to be transmitted by the UE device 24-1 at the first time with the second copy of the second packet P2 to be transmitted by the UE device 24-N at the second time, along with a first copy of the third packet to be transmitted by the UE device 24-2 at the third time (FIG. 6, step 300). The UE device 24-1 transmits the first packet P1 to the relay network node 28 at the first time (FIG. 6, step 302). The primary network node 22 overhears the first transmission and generates a copy of the first packet P1 (FIG. 6, step 304). The UE device 24-N transmits the second packet P2 to the relay network node 28 at the second time (FIG. 6, step 306). The primary network node 22 overhears the second transmission of the second packet P2 by the UE device 24-N and generates a first copy of the packet P2 (FIG. 6, step 308). The UE device 24-2 transmits the third packet P3 to the relay network node 28 at the third time (FIG. 6, step 310). The relay network node 28 network codes the second copy of the first packet P1, the second copy of the second packet P2, and the first copy of the third packet P3 to form a network coded packet P1⊕P2⊕P3 (FIG. 6, step 312). The relay network node 28 transmits the network coded packet P1⊕P2⊕P3 to the primary network node 22 (FIG. 6, step 314). The primary network node 22 uses the first copy of the first packet P1 and the first copy of the second packet P2 to decode the network coded packet P1⊕P2⊕P3 and extract from the network coded packet P1⊕P2⊕P3 the third packet P3 (FIG. 6, step 316). As discussed above with regard to FIG. 2, the primary network node 22 also extracts the second copy of the first packet P1 and the second copy of the second packet P2 from the network coded packet P1⊕P2⊕P3. The primary network node 22 sends an ACK to the relay network node 28 that indicates that the network coded packet P1⊕P2⊕P3 was successfully decoded (FIG. 6, step 318). The primary network node 22 may diversity combine the multiple copies of the first packet P1 to form a combined first packet P1 and similarly, diversity combine the multiple copies of the second packet P2 to form a combined first packet P2 (FIG. 6, step 320). In response to receiving the ACK from the primary network node 22, the relay network node 28 may release the packets P1, P2, and P3 (FIG. 6, step 322).

Figure 7:
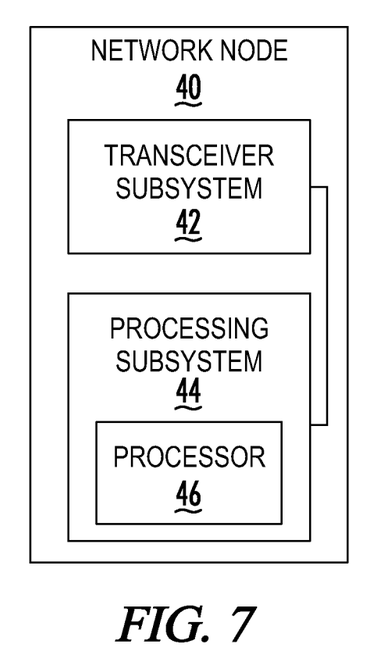
FIG. 7 is a block diagram of an exemplary network node according to one embodiment.

FIG. 7 is a block diagram of an exemplary network node 40 suitable for implementing aspects of the embodiments disclosed herein. The network node 40 may, for example, implement the primary network node 22 or the relay network node 28. The network node 40 includes a transceiver subsystem 42 and a processing subsystem 44. The transceiver subsystem 42 generally includes analog and, in some embodiments, digital components for sending and receiving communications to and from UE devices, such as the UE devices 24 within the wireless coverage area of the network node 40, as well as sending and receiving communications to and from other network nodes. From a communications protocol view, the transceiver subsystem 42 may implement at least part of Layer 1 (i.e., the Physical or "PHY" Layer). The processing subsystem 44 generally implements other remaining portions of Layer 1, as well as functions for higher layers in the wireless communications protocol (e.g., Layer 2 (data link layer), Layer 3 (network layer), etc.). Of course, the detailed operation for each of the functional protocol layers, and thus the transceiver subsystem 42 and the processing subsystem 44, will vary depending on both the particular implementation as well as the standard or standards supported by the network node 40.

Those skilled in the art will appreciate that the block diagram of the network node 40 necessarily omits numerous features that are not necessary to a complete understanding of this disclosure. Although all of the details of the processing subsystem 44 are not illustrated, the processing subsystem 44 comprises one or several general-purpose or special-purpose processors 46 or other microcontrollers programmed with suitable software programming instructions and/or firmware to carry out some or all of the functionality of the network nodes described herein. In addition, or alternatively, the processing subsystem 44 may comprise various digital hardware blocks (e.g., one or more Application Specific Integrated Circuits (ASICs), one or more off-the-shelf digital or analog hardware components, or a combination thereof) configured to carry out some or all of the functionality of the network nodes described herein. The network node 40 may also include one or more storage media for storing data necessary and/or suitable for implementing the functionality described herein, as well as for storing complex programming instructions which, when executed on the processor 46, may implement all or part of the functionality described herein. One embodiment of the present disclosure may be implemented as a computer program product that is stored on a computer-readable storage medium, the computer program product including complex programming instructions that are configured to cause a processor, such as the processor 46, to carry out the steps described herein.

The following acronyms are used throughout this disclosure:

3GPP 3rd Generation Partnership Project
ACK Acknowledgment
ASIC Application Specific Integrated Circuit
HeNB Home eNodeB
LTE Long Term Evolution
UE User Equipment
S-GW/MME Serving Gateway Mobility Management Entity Those skilled in the art will recognize improvements and modifications to the preferred embodiments of the present disclosure. All such improvements and modifications are considered within the scope of the concepts disclosed herein and the claims that follow.

What is claimed is:

1. A method for implementing diversity in a cellular communications system, comprising:
   determining, by a primary network node, a first time of a scheduled first transmission of a first packet that is to be wirelessly transmitted from a first device to a relay network node and a second time of a scheduled second transmission of a second packet that is to be wirelessly transmitted from a second device to the relay network node;
   at the first time, overhearing the scheduled first transmission directly from the first device and generating a first copy of the first packet;
   at the second time, overhearing the scheduled second transmission directly from the second device and generating a first copy of the second packet;
   receiving, from the relay network node, a network coded packet in which a second copy of the first packet has been encoded in conjunction with a second copy of the second packet;
   decoding, using the first copy of the second packet, the network coded packet to extract the second copy of the first packet; and
   diversity combining the first copy of the first packet with the second copy of the first packet to form a combined first packet.

2. The method of claim wherein overhearing the scheduled first transmission directly from the first device comprises listening for the scheduled first transmission at the first time at a first scheduled frequency.

3. The method of claim 1, further comprising:
   decoding, using the first copy of the second packet, the network coded packet to extract the second copy of the second packet; and
   diversity combining the first copy of the second packet with the second copy of the second packet to form a combined second packet.

4. The method of claim 1, further comprising:
   prior to the first, time, directing the relay network node to network code the second copy of the first packet and the second copy of the second packet in the network coded packet.

5. The method of claim 1, further comprising:
   determining, by the primary network node, a third time of a scheduled third transmission of a third packet that is to be wirelessly transmitted from a third device to the relay network node, the primary network node being unable to overhear the third transmission from the third device;
   directing the relay network node to network code the second copy of the first packet, the second copy of the second packet, and a first copy of the third packet;
   receiving the network coded packet, and using the first copy of the first packet and the first copy of the second packet to decode the network coded packet to extract the first copy of the third packet.

6. The method of claim 5, wherein the primary network node is unable to overhear the third transmission from the third device because the primary network node is outside of a transmission range of the third device.

7. The method of claim 1, further comprising:
   prior to the first time, directing the relay network node to network code the second copy of the first packet in the network coded packet.

8. The method of claim 7, wherein directing the relay network node to network code the second copy of the first packet in the network coded packet comprises sending a first scheduling message to the relay network node that directs the relay network node to network code the second copy of the first packet in the network coded packet.

9. The method of claim 7, further comprising indicating, by the primary network node, to the relay network node that the second copy of the first packet has been successfully network decoded.

10. A network node, comprising:
a transceiver subsystem configured to communicate with a relay network node and a first device; and
a processing subsystem coupled to the transceiver subsystem and configured to:
determine a first time of a scheduled first transmission of a first packet that is to be wirelessly transmitted from the first device to the relay network node and a second time of a scheduled second transmission of a second packet that is to be wirelessly transmitted from a second device to the relay network node;
at the first time, overhear the scheduled first transmission directly from the first device and generate a first copy of the first packet;
at the second time, overhear the scheduled second transmission directly from the second device and generate a first copy of the second packet;
receive, from the relay network node, a network coded packet in which a second copy of the first packet has been encoded;
decode the network coded packet to extract the second copy of the first packet; and
diversity combine the first copy of the first packet with the second copy of the first packet to form a combined first packet.

11. The network node of claim 10 wherein to overhear the scheduled first transmission directly from the first device, the processing subsystem is configured to listen for the scheduled first transmission at the first time at a first scheduled frequency.

12. The network node of claim 10, wherein the second copy of the first packet and a second copy of the second packet have been encoded in the network coded packet.

13. The network node of claim 12, wherein the processing subsystem is further configured to:
prior to the first time, direct the relay network node to network code the second copy of the first packet and the second copy of the second packet in the network coded packet.

14. A computer program product for receiving data in a cellular communications system, the computer program product stored on a non-transitory computer-readable storage medium and including instructions configured to cause a processor to carry out the steps of:
determining, by a primary network node, a first time of a scheduled first transmission of a first packet that is to be wirelessly transmitted from a first device to a relay network node and a second time of a scheduled second transmission of a second packet that is to be wirelessly transmitted from a second device to the relay network node;
at the first time, overhearing the scheduled first transmission directly from the first device and generating a first copy of the first packet;
at the second time, overbearing the scheduled second transmission directly from the second device and generating a first copy of the second packet;
receiving, from the relay network node, a network coded packet in which a second copy of the first packet has been encoded;
decoding the network coded packet to extract the second copy of the first packet; and
diversity combining the first copy of the first packet with the second copy of the first packet to form a combined first packet.

15. The method of claim 1, wherein the network coded packet is network coded using, an exclusive OR function.

* * * * *

UNITED STATES PATENT AND TRADEMARK OFFICE
CERTIFICATE OF CORRECTION

| | | |
|---|---|---|
| PATENT NO. | : 8,913,543 B2 | Page 1 of 1 |
| APPLICATION NO. | : 13/409842 | |
| DATED | : December 16, 2014 | |
| INVENTOR(S) | : Zainaldin | |

It is certified that error appears in the above-identified patent and that said Letters Patent is hereby corrected as shown below:

Title Page, under "Primary Examiner", in Column 2, Line 1, delete "Mark Rinehard" and insert -- Mark Rinehart --, therefor.

Claims

In Column 10, Line 27, in Claim 2, delete "claim" and insert -- claim 1 --, therefor.

In Column 10, Line 39, in Claim 4, delete "first," and insert -- first --, therefor.

In Column 12, Line 24, in Claim 14, delete "overbearing" and insert -- overhearing --, therefor.

In Column 12, Line 36, in Claim 15, delete "using," and insert -- using --, therefor.

Signed and Sealed this
Seventeenth Day of May, 2016

Michelle K. Lee
*Director of the United States Patent and Trademark Office*